(12) United States Patent
Desmitt et al.

(10) Patent No.: US 8,602,576 B1
(45) Date of Patent: Dec. 10, 2013

(54) LIGHTWEIGHT MIRROR BLANKS BY DEPOSITION

(75) Inventors: Steven M. Desmitt, Fairport, NY (US); David N. Strafford, Leesburg, VA (US)

(73) Assignee: Exelis, Inc., McLean, VA (US)

( * ) Notice: Subject to any disclaimer, the term of this patent is extended or adjusted under 35 U.S.C. 154(b) by 509 days.

(21) Appl. No.: 12/846,066

(22) Filed: Jul. 29, 2010

(51) Int. Cl.
*G02B 5/08* (2006.01)

(52) U.S. Cl.
USPC .......................................... 359/883

(58) Field of Classification Search
USPC ................. 359/848, 846, 849, 883, 872
See application file for complete search history.

(56) References Cited

U.S. PATENT DOCUMENTS

| | | | |
|---|---|---|---|
| 5,071,596 A | | 12/1991 | Goela et al. |
| 5,076,700 A | * | 12/1991 | DeCaprio ................. 359/848 |
| 5,741,445 A | | 4/1998 | Taylor et al. |
| 7,766,494 B1 | * | 8/2010 | Desmitt et al. .............. 359/848 |
| 2006/0121196 A1 | | 6/2006 | Tanaka |

* cited by examiner

*Primary Examiner* — Euncha Cherry
(74) *Attorney, Agent, or Firm* — RatnerPrestia

(57) ABSTRACT

An improved method for forming inexpensive, lightweight, closed-back, silicon carbide mirrors, via chemical vapor deposition (CVD) or chemical vapor composites (CVC), is achieved by using a two dimensional corrugated core with sloped walls. All layers in this design are chemical vapor deposited optical grade silicon carbide. Seamless cohesion between layers is achieved by depositing the material on the sloped walls of, and through holes in, the mandrel. The resulting structure is cohered and monolithic. The mandrels are matched in coefficient of thermal expansion (CTE) to the deposited material. Mandrels that support the layers are later removed by a separate process.

23 Claims, 9 Drawing Sheets

(Detail of Fig. 4b)

(Section A-A of Fig. 4a)

Fig. 5a (Bottom View)

Fig. 5b (Section A-A of Fig. 5a)

LIGHTWEIGHT MIRROR BLANKS BY DEPOSITION

FIELD OF THE INVENTION

The present invention is related to lightweight mirrors or mandrels made from ceramic materials. In particular this invention is a closed-back design with a chemical vapor deposition process for making the same.

BACKGROUND OF THE INVENTION

The need for better ground and space based telescope resolution has driven the manufacturing of larger diameters of primary mirrors of such telescopes. However, larger diameter primary mirrors result in the primary mirrors having additional weight and manufacturing problems. For example, because large solid mirror blanks weigh more, they require more time to cast and to anneal. The heavier mirror blanks also bend under their own weight, and are more difficult to maneuver in the factory. For space-based mirrors, the zero gravity back-out, for testing purposes, is smaller and therefore, simpler and more accurate for lightweight mirrors. Special mounting and supporting is required if accurate testing is to be achieved.

In contrast, lightweight mirror assemblies, fabricated from lightweight mirror blanks, have the advantage of increasing the stiffness-to-weight ratio, and therefore the frequency of the first resonant mode. The higher first resonant mode ensures lower coupling between system vibrations and mirror vibrations. Lighter mirror blanks also reduce the gravity sag and the gravity back-out, reducing measurement uncertainty of a 1-G test in a 1-G environment. Light weighted mirror blanks, as it is termed in the industry by those skilled in the art, make the finished mirror assembly more tolerant of spacecraft maneuvers, as well as increasing the mirror's stability. Lightweight mirrors assemblies also result in lighter payloads and smaller launch rockets.

Lightweight mirrors are the desired end product. U.S. Pat. No. 5,071,596 (hereinafter "Goela"), incorporated herein by reference, shows a two-layer open back design where a separate layer of silicon is needed for the optical surface. This layer is deposited after the second layer coheres the core structure to the first layer. The core is described as an "'egg crate' core from graphite ribs about 0.020 inch (0.5 mm) thick . . . " The diagrams and descriptions show the core to be thin and substantially perpendicular to the face sheet. In this disclosure, the thin ribs are completely encased in deposited material and are not subsequently removed or oxidized. Therefore, they become part of the support structure. During thermal variation, small differences in the coefficient of thermal expansion (CTE) between the core material and deposition material exert forces on the optical surface and thereby distort the mirror.

Additionally, U.S. Pat. No. 5,741,445 (hereinafter "Taylor"), incorporated herein by reference, shows a three-layer design. Depending upon the desired application of the mirror, this three-layer design may be preferred. As disclosed in this patent, this design uses interlocking silicon carbide (SiC) ribs forming straight walls and a closed back. The design is quite scalable and divides the mirror into smaller components. The design requires secondary machining between depositions to render surfaces co-planar (e.g. the case of a piano mirror). Referring to the patent's back plate 20, "An access hole 64 is provided for each cell of the cell structure 26." Again, more secondary machining in SiC is required.

Sloping walls allow thinner depositions and better cohesion at the interface between supports. As described in Goela, "[a]nother consequence of CVD deposition is that the walls of the backstructure [sic.] are tapered with the thinnest SiC coating near the faceplate." This description reveals a shortcoming as the strength of the bond is limited by the coating thickness.

SUMMARY OF THE INVENTION

As described above, and throughout the written description below, an object of the present invention is to provide a lightweight mirror blank (unfinished mirror) with exceptional stiffness. It is also an object of this invention to provide a mirror blank that can be easily manufactured at a reasonable cost. Another object of this present invention is to provide a process of manufacture that minimizes the time required to fabricate the mirror blank thereby allowing an efficient production of the mirror blank. Finally, yet another object of this invention is to provide a process that produces a mirror blank that requires the least amount of work to finish the blank into a mirror.

The mirror is constructed by cohering a core to a face sheet, of the same material, using a vapor deposition process. This face sheet may be attached to a mandrel already. The core (typically graphite) supports a second deposition. As the deposited material coats the core, as well as the face sheet (through openings in the core), the core is cohered to the face sheet. The process may be repeated for a third, back layer. Openings in the third mandrel result in cohesion to the second deposition as well as forming the back layer. The resulting mirror blank is a monolithic structure.

In one exemplary embodiment, the resulting structure is maximally dense SiC with no distinguishing cohesion lines between depositions. All mandrels are easily removed by oxidation resulting in a lightweight mirror blank with a near net shape. Wall and layer thicknesses on the order of 1 mm are possible.

The present invention relates to a lightweight mirror assembly made from multiple layers. The mirror assembly includes a first layer. Disposed on top of the first layer are multiple support structures forming a second layer. The support structures have sloping walls extending upwardly at an obtuse angle from the first layer and terminating at a first height. A plurality of ribs connect adjacent support structures. The plurality of ribs have a second height as measured from the first layer. The first height is larger than the second height. In some exemplary embodiments of the present invention, at least one of the ribs may form a wall extending upwardly from the first layer. At least one of the ribs may form a rod extending between adjacent support structures. The two rib types may possibly be used in the same second layer. Three of the ribs connecting non-collinear, adjacent support structures may form three respective lines. Additionally, at least one of the ribs may form a step extending upwardly from the first layer.

In some exemplary embodiments of the present invention, at least one of the support structures includes at least one of the sloping walls terminating in a flat portion at the first height. In some exemplary embodiments of the present invention at least one of the support structures includes sloping walls forming a portion of a pyramid. Additionally, in some exemplary embodiments, at least one of the support structures includes a circular sloping wall forming a portion of a cone.

Some exemplary embodiments of the present invention provide for at least a third layer is disposed on top of the second layer. The third layer may terminate at a third height and the third layer may joins the support structures into a common surface. In some exemplary embodiments, the third height is the same as the first height.

In some exemplary embodiments of the present invention, the first layer and the second layer may be comprised of the same material. This same material is not limited to any one specific material but may include silicon carbide, boron carbide or titanium diboride. In some exemplary embodiments of the present invention, a plurality of layers is disposed on top of the previous layer and the plurality of layers are joined to preceding layers by chemical deposition.

The present invention also relates to a method for producing a mirror assembly. The method, according to some exemplary embodiments, includes forming, on a first mandrel surface, a first layer of the mirror assembly through a chemical deposition. A second core mandrel may then be disposed on top of the first layer. The second core mandrel may consist of multiple support structures including walls extending upwardly at an obtuse angle from the first layer and terminating at a first height. The second core mandrel may also consist of a plurality of ribs connecting adjacent support structures having a second height measured from the first layer. The ribs and said support structures may define at least one opening in the second core mandrel. Finally, a second layer of the mirror assembly may be formed on the second core mandrel through a chemical deposition such that the second layer covers the support structures and ribs of the second core mandrel and the second layer coheres with the first layer at the openings in the second core mandrel.

In some exemplary embodiments of the present invention, the method also includes removing the second core mandrel from the mirror assembly. The second core mandrel may be removed through a burnout process, a melting process or other similar removal process.

In some exemplary embodiments of the present invention, the method for producing the mirror assembly contains an additional step of disposing at least a third back plate mandrel on top of the second layer. The third back plate mandrel may consist of a back plate structure and may terminate at a third height. The third back plate mandrel may define a plurality of openings, with each opening corresponding to the covered support structures of the second layer. A third layer of the mirror assembly may be formed on the third back plate mandrel through a chemical deposition such that the third layer coheres with the second layer at the openings in the third back plate mandrel. In some exemplary embodiments of the present invention, the method includes another step in which the second core mandrel and the third back plate mandrel are removed from the mirror assembly. This removal may be through a burnout process, a melting process, or any other applicable removal method.

Aspects of the present invention also relate to a core mandrel for is producing a mirror assembly. In some exemplary embodiments the core mandrel includes multiple support structures including walls extending upwardly at an obtuse angle from a base of the mandrel and terminating at a first height. The core mandrel may also include a plurality of ribs connecting adjacent support structures having a second height measured from the base of the mandrel. The ribs and the support structures may also define at least one opening in the core mandrel.

At least one of the ribs may form a wall extending upwardly from the base of the mandrel. In the alternative, at least one of the ribs may form a rod extending between adjacent support structures. These two types of ribs may occur on the same core mandrel. In some exemplary embodiments, at least one of the support structures may include at least one of the sloping walls which terminates in a flat portion at the first height. In some exemplary embodiments, at least one of the support structures may include sloping walls forming a portion of a pyramid. In other exemplary embodiments at least one of the support structures includes a circular sloping wall forming a portion of a cone. Three of the ribs connecting non-collinear, adjacent support structures may form three respective lines. At least one of the ribs forms a step extending upwardly from the first layer.

BRIEF DESCRIPTION OF THE DRAWINGS

The foregoing summary, as well as the following detailed description of exemplary embodiments of the invention, may be better understood when read in conjunction with the appended drawings, which are incorporated herein and constitute part of the specification. For the purposes of illustrating the invention, exemplary embodiments of the present invention are shown. It is understood, however, that the invention is not limited to the precise arrangements and instrumentalities shown. In the drawings, the same reference numerals are employed designating the same elements throughout the several figures. In the drawings:

FIG. 5b is a cross-sectional illustration of the scaled mirror blank assembly along the cross-sectional line A-A from FIG. 5a;

FIG. 6a is a bottom-view illustration of a mirror blank assembly with a cross-sectional line A-A that may be used by the present invention;

FIG. 6b is a cross-sectional illustration of the mirror blank assembly along the cross-sectional line A-A from FIG. 6a;

To facilitate understanding, identical reference numerals have been used, where possible, to designate identical elements that are common to the figures. To simplify the drawings and to improve understanding, hidden lines have been removed.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention. The above summary and other objects, features, and advantages of the present invention become more apparent when taken in conjunction with the following description and drawings. The parts list appearing below may be used in conjunction with the drawings and the detailed description appearing below.

| | |
|---|---|
| 1 | layer one |
| 2 | layer two |
| 3 | layer three |
| 7 | sloped walls |
| 10 | optical mandrel |
| 20 | core mandrel |
| 21 | mandrel two support land |
| 22 | mandrel two drilled-out section |
| 23 | deposition angle |
| 24 | burn out dimple |
| 25 | cone angle |
| 26 | mandrel two contact surface |
| 27 | openings in mandrel two |
| 28 | grooves in mandrel two |
| 29 | bridges between support structures |
| 30 | back plate mandrel |
| 31 | opening in mandrel three |
| 32 | dimple in mandrel three |
| 40 | mirror blank assembly |
| 41 | mirror blank assembly with mandrels |
| 43 | chamber one |
| 44 | chamber two |

An improved method for fabricating low-cost, short-fabrication time, lightweight mirrors is provided. This invention relates to mirror blanks and any other useful structures that benefit the manufacturing technique. These other useful structures include but are not limited to mandrels that cast optical quality surfaces may also be constructed using the invention. The proposed invention deals with numerous deficiencies in the prior art by designing the core mandrel so that the core mandrel may be removed later. This may generally be accomplished by sloping the core walls and providing a passage by which oxidizing gas may penetrate all core regions enabling the core mandrel to be completely removed. This may allow for the remaining structure to be constructed from a single material.

The design and manufacture of the present invention also allows for providing tools that are easily machined in graphite and result in blanks with little secondary machining required. The design of the present invention maximizes the amount of material at the intersection and minimizes the masking effect from adjacent walls. In this design, the mandrels may be coated with a double thickness of material adding strength to the core. The corrugated core design, with sloped walls and openings is a single structure, facilitating assembly and alignment, with minimal mandrel material to be removed after deposition. The core may be cohered to the face sheets with the same material as the face sheets and cohered through the core by simultaneously coating the core as well as through the core.

The sloping walls distribute the stresses in the material if there are any mismatches in expansion between the mandrel and material deposited. The sloping is walls provide conduits through which oxidizing gas may later remove the core.

The present invention relates to the design of a lightweight mirror assembly where a material is deposited on two or more surfaces. These surfaces may be mandrels such as the ones that are shown and described in FIG. 1 as optical mandrel 10, core mandrel 20, and back plate mandrel 30. The mandrels may be constructed of a material that can be removed sometime after deposition. In one exemplary embodiment of the present invention, all the mandrels described in FIG. 1 are constructed from fine-grain graphite.

The deposition material may be any material that matches the optical mandrel 10, core mandrel 20, and back plate mandrel 30 in coefficient of thermal expansion (CTE). In one exemplary embodiment silicon carbide (SiC) was used as the deposition material. Thus, in this exemplary embodiment, layer one 1, layer two 2, and layer three 3 of FIG. 1 are separate SiC depositions. The coefficient of thermal conductivity, stiffness, and strength to weight ratio for SiC make it an excellent choice for mirror materials. Other possible deposition materials such as boron carbide and titanium diboride may be used.

Vapor deposited silicon carbide is available in different forms that impact how the material is later processed. For example, pure chemical vapor deposition of SiC (β-CVD SiC) is known to grow in columnar structures that later limit the surface roughness. As described in U.S. Patent Application No. 2006/0121196, incorporated herein by reference, a silicon carbide chemical vapor composite (SiC CVC™) process where the SiC morphology is improved, provides a maximally dense material with fine grain structure. The improved material may be polished to less than 2 nm rms roughness thus making it an "optical grade." One exemplary embodiment of the present invention was designed with optical grade SiC, hence forth referred to as SiC. The SiC CVC™ was chosen so that subsequent cladding to optical surfaces would be unnecessary.

Figure 1:
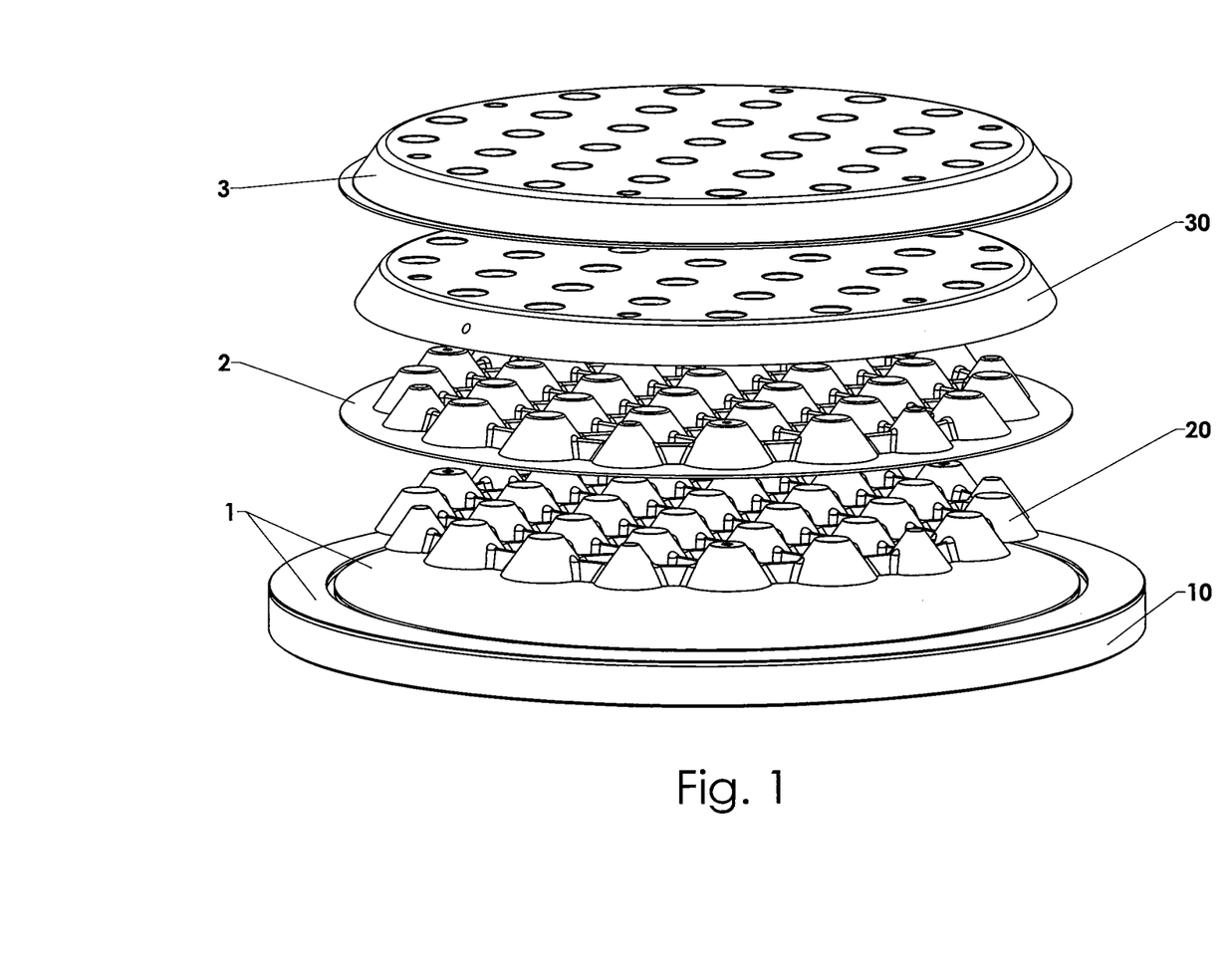
FIG. 1 is an exploded-view illustration of the mandrels and layers of a lightweight mirror assembly that may be used by the present invention.

To create the lightweight mirror assemblies of the present invention, a first deposition may be made onto an optical mandrel 10 as shown in FIG. 1. Optical mandrel 10 is the negative of the desired optical surface. Most often, an equation describing the mandrel is the same as the desired optical surface except for a minus sign. However, as optical mandrel 10 may deliver an optical surface close to the desired prescription, differences in CTE may generate offsets from nominal. Deviations from nominal may be corrected by biasing the initial curve. The optical surface of optical mandrel 10 may be planar or curved and is in direct contact with layer one 1. However, release agents, of negligible thickness, between optical mandrel 10 and layer one 1 may be used. If graphite mandrels are used, a typical release agent is colloidal graphite suspended in acetone that is sprayed onto the graphite mandrel prior to deposition. Fine graphite particles sitting on the graphite mandrel result in a loosely bonded deposition. Following the layer one 1 deposition, a choice must made to either continue depositions according to FIG. 1 or release layer one 1 from the optical mandrel 10 prior to subsequent depositions. Immediate release offers some advantages. Layer one 1 may be inspected for defects before investing more time and material. Layer one 1 may be also be machined to improve the figure or remove surface defects. It should be noted however, that immediate release of layer one 1 is not required.

In some exemplary embodiments of the present invention it is possible to reuse the optical mandrel 10. This can be advantageous to cutting down on the cost of manufacturing and may be done when the release layer is effective. The removal process of optical mandrel 10 may be mechanical, sometimes requiring a release agent between optical mandrel 10 and layer one 1, and in other exemplary embodiments it does not require the use of a release agent.

Alternatively, optical mandrel 10 may be removed by machining. Features in optical mandrel 10 may be added to aid the release process. Such features (not shown in any figures) may include blind holes, key ways, grooves or any other mechanical feature that would offer a point of attachment. If these approaches to releasing optical mandrel 10 fail, and the mandrel is made from graphite, the optical mandrel 10 may be oxidized or burned off as required.

Figures 2, 2A, 2B:
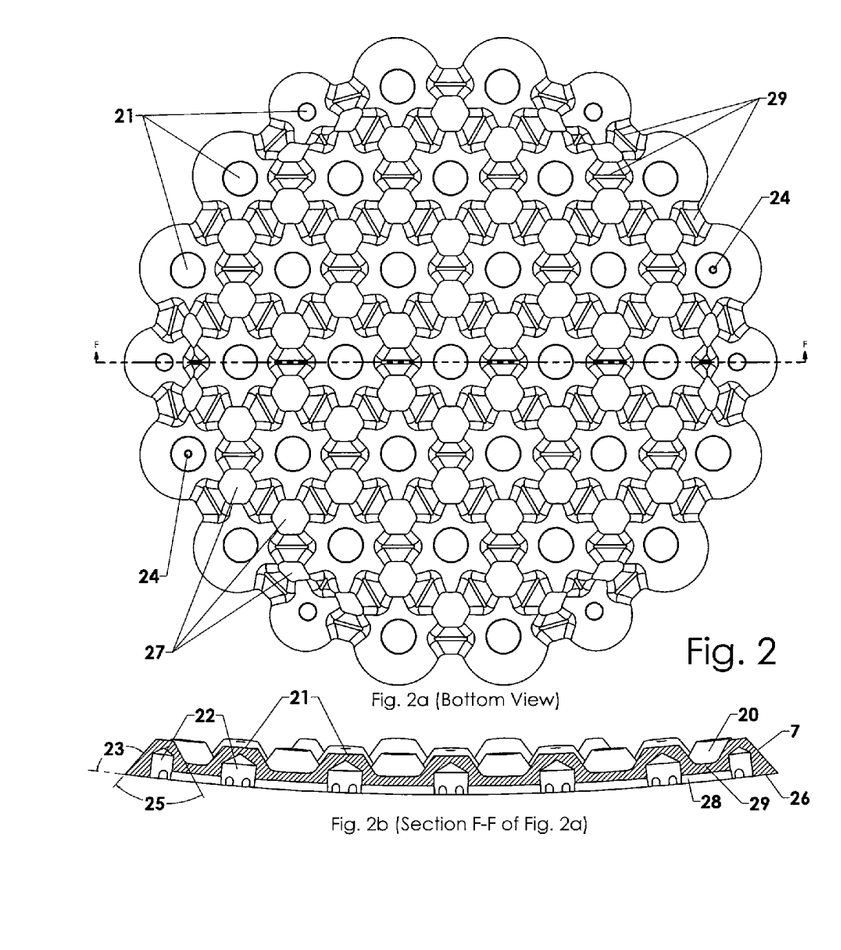
FIG. 2a is a bottom-view illustration of a core mandrel that may be used by the present invention with a cross-sectional line designated by F-F.
FIG. 2b is a cross-sectional illustration of the core mandrel shown in FIG. 2a along the line F-F.
Figures 2, 2C, 2D, 2E:
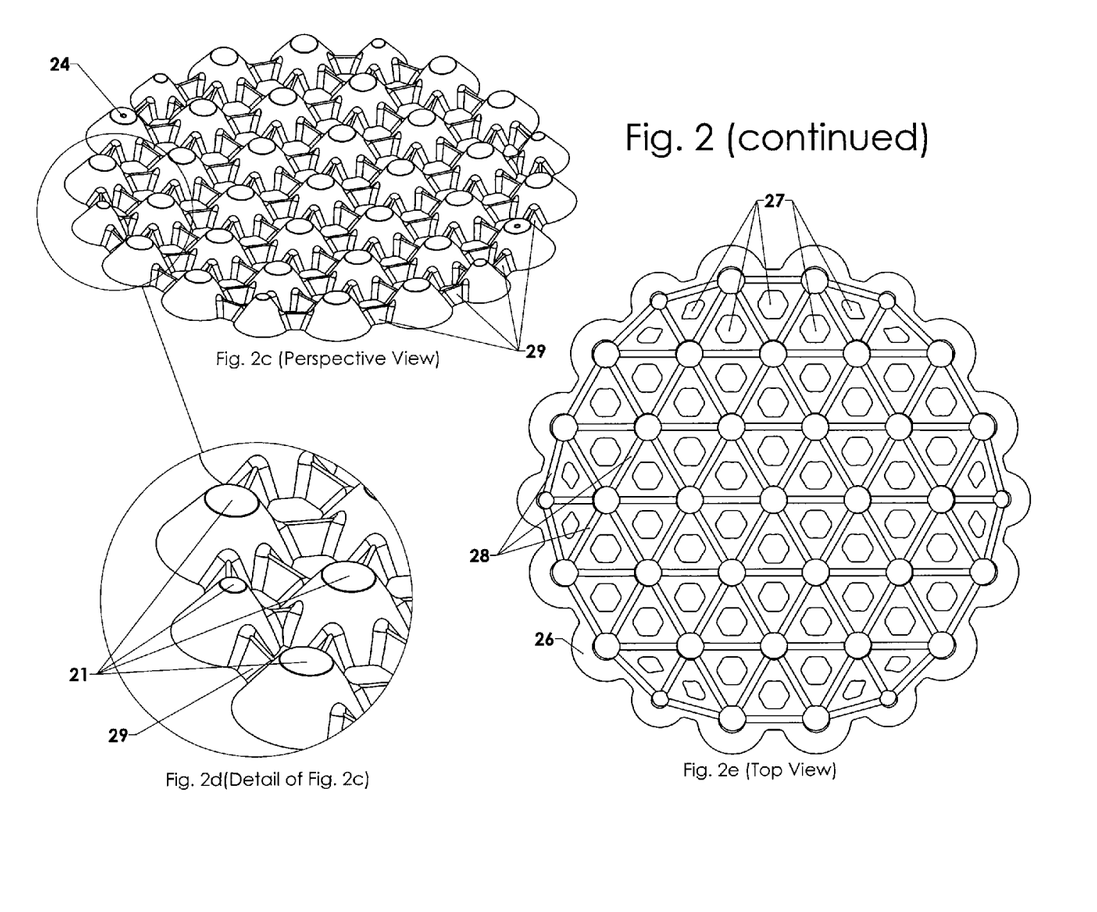
FIG. 2c is a perspective-view illustration of a core mandrel that may be used by the present invention.
FIG. 2d is a magnified-view illustration of the detail in FIG. 2c of the core mandrel that may be used by the present invention.
FIG. 2e is a top-view illustration of a core mandrel that may be used by the present invention.

Core mandrel 20 is positioned on layer one 1 in preparation for the second deposition. Alignment features such as bosses, dimples, and grooves may be added to either layer one 1 (by machining) or core mandrel 20 to ensure proper alignment of layer 1 and core mandrel 20. These features are optional to the present invention and are not shown in any figures. FIG. 2 shows core mandrel 20 from various different viewpoints. FIG. 2a shows a bottom-view illustration of core mandrel 20. In FIG. 1, the optical surface layer one 1 faces down so core mandrel 20 is on the back of the mirror and mandrel two support land 21 (shown in FIG. 2) is furthest from the optical surface. When layer two 2 is deposited, core mandrel 20 is coated with the deposited material. FIG. 2 shows openings 27 in mandrel two. The openings 27 in mandrel two result in more deposited material applied to layer one 1. The additional material deposited through the openings 27 in mandrel two is also contiguous with layer two 2. Thus openings 27 in mandrel two are effectively cohesion sites between layer one 1 and layer two 2. Coating thicknesses are typically 0.1-2.0 mm. The thickness is selected to ensure that any gaps between mandrel two contact surface 26 and layer one 1 are bridged. The minimum layer two 2 thickness deposited may be driven by the gap distances.

Mandrel two support land 21 sizes and positions are driven by mirror requirements. Core mandrel 20 in FIG. 2 may be designed for a 0.25 m diameter convex mirror with a circular profile. In an exemplary embodiment of the present invention, a hexagonal array of mandrel two support lands 21 was chosen. The hexagonal pattern of mandrel two support lands 21 may be adjusted near the perimeter to give a circular pattern or to provide for any other pattern as needed for the application of the lightweight mirror assembly.

During the material deposition core mandrel 20 becomes encased in deposited material forming layer two 2. To make the mirror assembly structure as lightweight as possible, core mandrel 20 may be removed. Removal of the core mandrel 20 is performed in most exemplary embodiments of the present invention. Mechanically removing core mandrel 20 is not possible as it is encased in deposited material. In the case where core mandrel 20 is graphite, removal may be accomplished by oxidation or "burn out" and may be done while optical mandrel 10 is burned out. To enable oxidation, several features are added to core mandrel 20. The mandrel support lands 21 are joined together with bridges between support structures 29. The bridges between support structures 29 provide a continuous path for an oxidizing gas to follow. In addition to aiding in removal of the core mandrel 20, bridges between support structures 29 also add extra stiffness and support to the mirror. An input port may be drilled into core mandrel 20 at burn out dimple 24 and drilled into an exit port at a second burn out dimple 24. The input and exit port enable gas to flow through the core mandrel 20. Grooves 28 in mandrel two are cut into mandrel two contact surface 26 to provide a path for the oxidizing gas to navigate through core mandrel 20. In some exemplary embodiments of the present invention, oxygen and air may be used as the oxidizing gases. The use of the input port, exit port and grooves 28 provide for higher flow rates of the oxidizing gases and help to hasten burn out. In some exemplary embodiments, an exhaust port may be provided to also help hasten the burn out process. To further enable the oxidizing gas, mandrel two drilled-out sections 22 minimizes the amount of graphite to be oxidized. Thus core mandrel 20 is as much a shell as possible.

In another exemplary embodiment of the present invention, burnout may be achieved through the use of other gases or processes. Additionally, removal of the core mandrel 20 or mandrels may be accomplished through the use of numerous other methods such as acidic wash, melting, dissolving, high pressure water, or any other chemical or physical action.

Figure 2F:
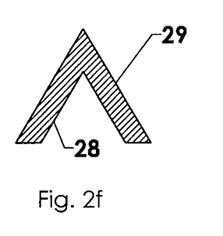
FIG. 2f is a cross-sectional illustration through bridges between support structures on a core mandrel that may be used by the present invention.
Figure 2G:
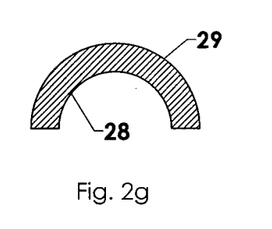
FIG. 2g is a cross-sectional illustration through bridges between support structures on a core mandrel that may be used by the present invention.
Figure 2H:
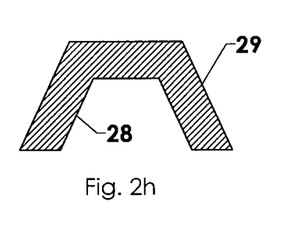
FIG. 2h is a cross-sectional illustration through bridges between support structures on a core mandrel that may be used by the present invention.

Core mandrel 20 in FIG. 2 is designed with bridges between support structures 29 support structures and may have a cross-sectional geometry as shown in FIGS. 2f, 2g and/or 2h. It is understood that other geometries are possible and are not exhaustively listed or shown in the present application.

Sloped walls 7 in core mandrel 20 are features that provide a substantial path for grooves in mandrel two 28 to follow. The sloped walls 7 also provide a surface on which the deposition material collects. The angle between layer one 1 and core mandrel 20 is defined to be the deposition angle 23. When mandrel two contact surface 26 is planar, this angle is well defined. When mandrel two contact surface 26 is curved, the deposition angle 23 is nominal and varies by the slope associated with mandrel two contact surface 26. In an exemplary embodiment of the present invention, SiC CVC™ material may be deposited with a deposition angle 23 greater than 120° and cone angle 25 was 70°.

In the case where core mandrel 20 or back plate mandrel 30 is a shell of deposited material, removing the encased mandrel may no longer be necessary; however, in this case, the mirror may be heavier than necessary. In this case, optical mandrel 10, core mandrel 20, and back plate mandrel 30 may be constructed in independent depositions and later joined using additional depositions. Although, this is approach adds additional mass and requires additional depositions it may help solve assembly problems that occur with specific geometry challenges.

As discussed above, applying two layers of deposited material provides an open-back two-layer mirror design. This open-back two-layer mirror design may be sufficient to meet the requirements of some mirror assemblies and may incorporate the present invention in its entirety. In this case, the core mandrel 20 is removed by drilling access ports through burn out dimples 24 and through core mandrel 20 into mandrel two drilled-out sections 22. When graphite is the mandrel material, oxidizing gas flowing through grooves 28 in mandrel two and consumes core mandrel 20.

In yet another exemplary embodiment, core mandrel 20 may be designed so that a plurality of such cores could be fitted together with adjoining pieces, thus creating a segmented core. Such a core may simplify manufacturing and reduce the risk during fabrication. A segmented core mandrel 20 permits material suppliers of such mandrels flexibility in cutting around damaged areas of raw material as well as reducing the fabrication time. Some grades of materials used for core mandrel 20 may only be available in smaller sizes. In this case a segmented approach would be more convenient and less expensive. Pieces adjoining core mandrel 20 together may also function as a conduit for later mandrel removal.

Figures 3, 3C:
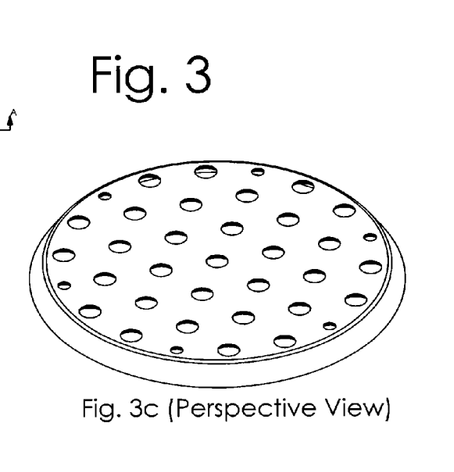
FIG. 3c is a perspective-view illustration of a back plate mandrel that may be used by the present invention.
Figure 3A:
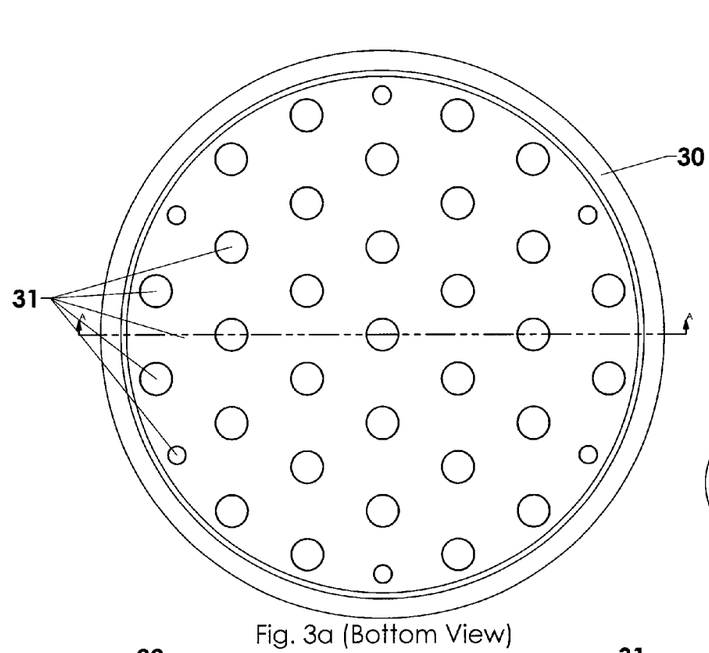
FIG. 3a is a bottom-view illustration of a back plate mandrel that may be used by the present invention with a cross-sectional line designated by A-A.
Figures 3A, 3B:
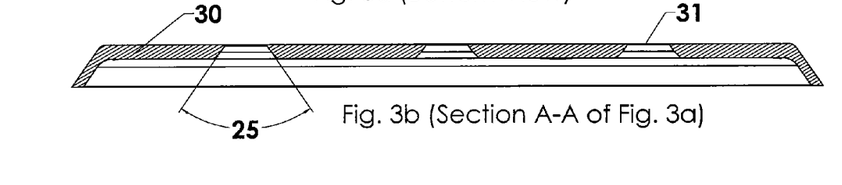
FIG. 3b is a cross-sectional illustration of the back plate mandrel from FIG. 3a along the cross-sectional line A-A.

In some exemplary embodiments of the present invention, the lightweight mirror assembly requires extra mirror stiffness and a suitable mounting surface. In these exemplary embodiments, the mirror assembly may be created with a third layer. FIG. 3 shows the back plate mandrel 30 with several openings 31 in mandrel three. Openings in mandrel three 31 align with mandrel two support lands 21. Mandrel two support lands 21 are designed so that when a nominal deposition is applied, openings in mandrel three 31 are flush with layer two 2. Similar to openings in mandrel two 27, openings in mandrel three 31 allow additional deposited material to cohere layer two 2. The same deposition also coats back plate mandrel 30 thereby cohering layer three 3 to layer two 2. FIG. 3b shows that nominally, the openings 31 in mandrel three are tapered by cone angle 25. When the back plate mandrel 30 is graphite, slight adjustment to this mandrel may be accomplished by filing the openings 31 in mandrel three should an interference condition exist. As layer two 2 thickness may vary slightly, mandrel two support lands 21 either stand above or be slightly recessed with respect to layer three 3. Even perfectly matched in height, the gaps between layer two 2 and openings in mandrel three 31 layer three 3 may show features from core mandrel 20. For this reason, layer three 3 on FIG. 1 is shown with circular features.

Figure 4A:
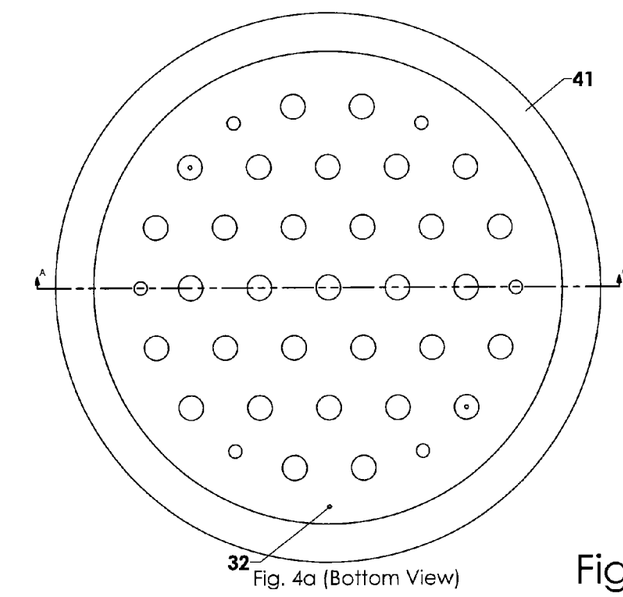
FIG. 4a is a bottom-view illustration of a mirror blank assembly with mandrels and cross-sectional line A-A that may be used by the present invention.
Figures 4A, 4B:
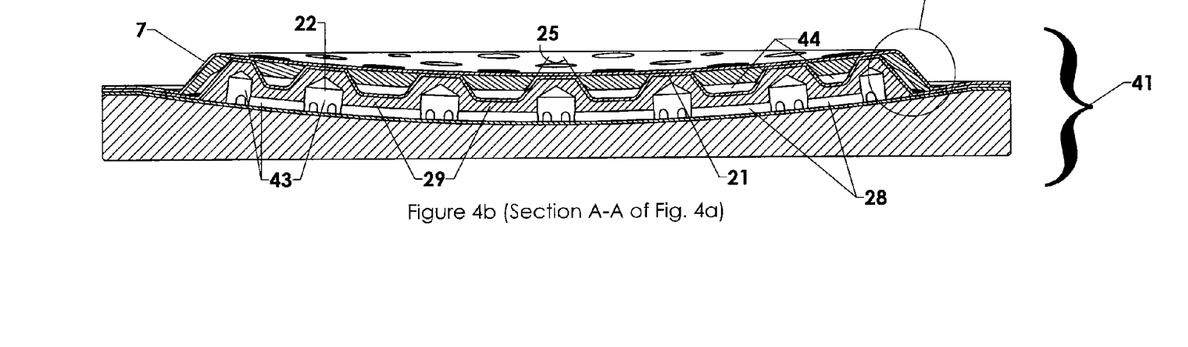
FIG. 4b is a cross-sectional illustration of the mirror blank assembly with all mandrels from FIG. 4a along the cross-sectional line A-A.
Figures 4B, 4C:
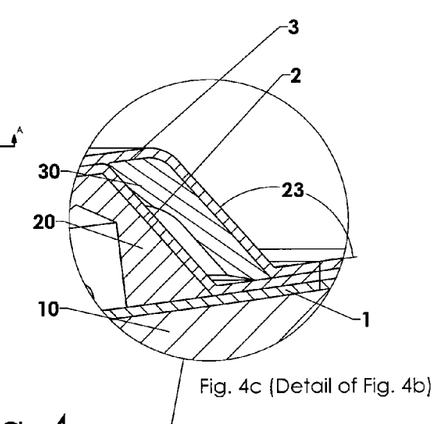
FIG. 4c is a magnified-view illustration of the detail in FIG. 4b of the mirror blank assembly with mandrels that may be used by the present invention.

FIG. 4 shows the mirror blank assembly with mandrels 41. Two separate chambers have been created from the two depositions. Chamber one 43 is between layer one 1 and the core mandrel 20. Chamber one 43 also connects to mandrel two drilled-out section 22 as well as grooves in mandrel two 28. Chamber two 44 is between layer two 2 and the back plate mandrel 30. Removing each mandrel by oxidation requires penetration into each chamber with an oxidizing gas. A dimple 32 in mandrel three is a feature from mandrel three 30 that marks a place to drill through layer three 3 and mandrel three 30. Adding a second penetration into each chamber helps hasten the burn out process. Weighing the mirror blank assembly with mandrels 41 before and after oxidation reveals weight loss and remaining mass indicates if insufficient oxidation occurs.

In FIG. 4b and FIG. 4c, while the hatching from the cross-section indicates different deposited layers, the material at these cohesions is homogeneous and cohesion lines are difficult to detect. FIG. 4b shows optical mandrel 10 still attached to layer one 1, however this situation is optional and is not needed in all exemplary embodiments of the present invention.

Figures 5, 5A:
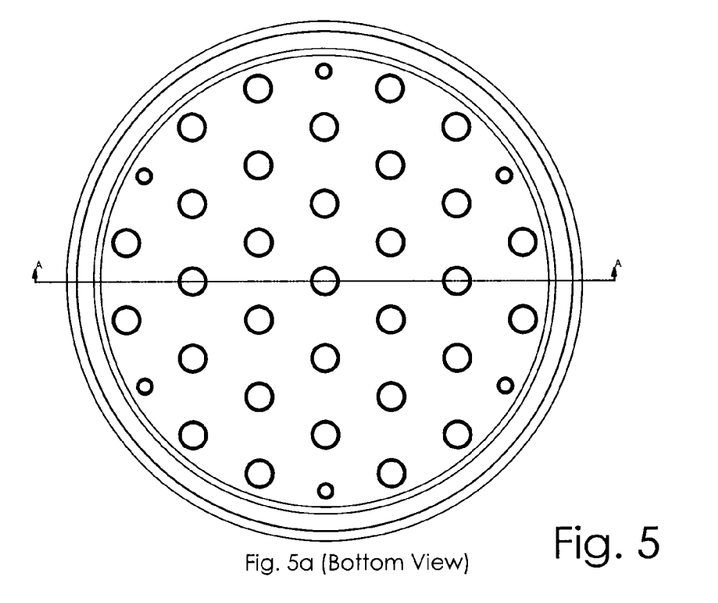
FIG. 5a is a bottom-view illustration of a scaled mirror blank assembly with a cross-sectional line A-A that may be used by the present invention.

FIG. 5 shows mirror blank assembly 40 with all mandrels removed. While FIG. 5b cross-sectional view shows the three separate layers, the material at the boundary is homogeneous and maximally dense. As such, the mirror blank assembly 40 material behaves as though it were constructed from a single material, exhibiting no variability due to environmental changes. The mirror blank assembly 40 shown in FIG. 5 is also discussed in Example 1.

Figures 6, 6A, 6B:
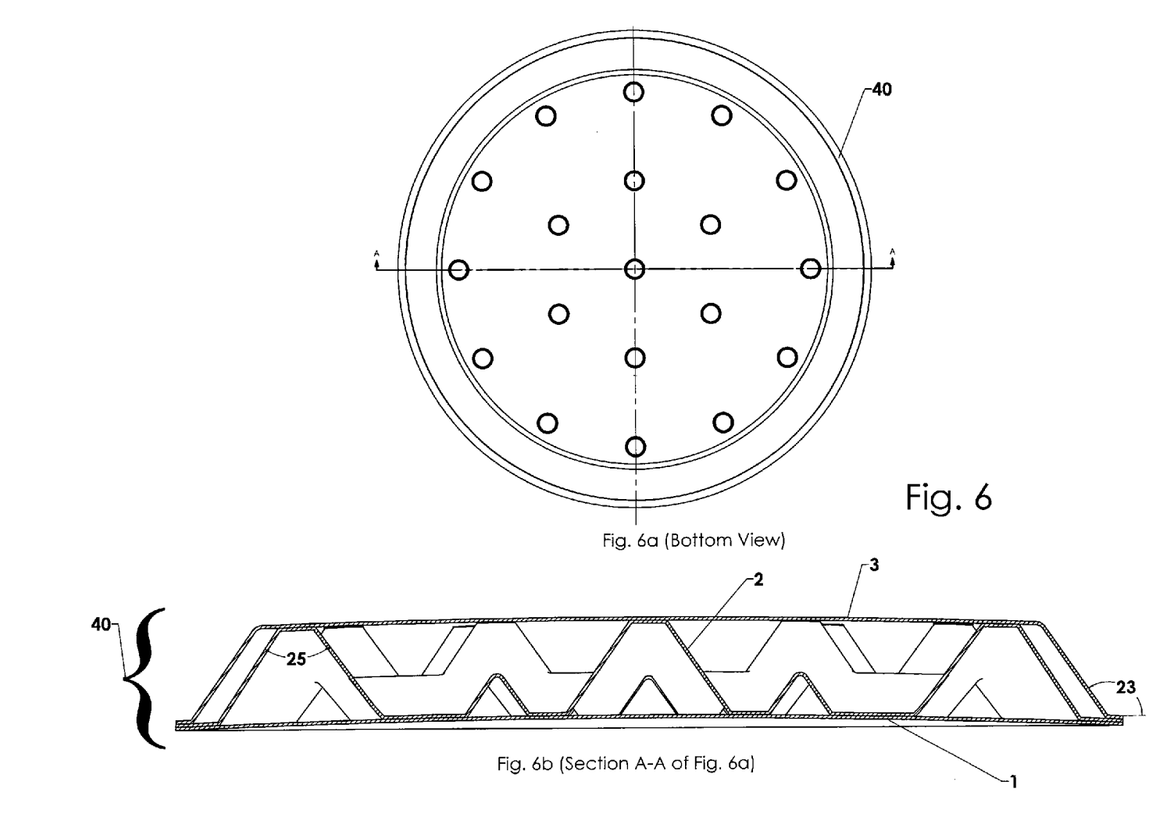

FIG. 6a shows a mirror blank assembly 40 with a concave surface. The spacing of mandrel two support lands 21 were designed to be traceable to a 1 meter diameter part. Mirror blank assembly 40 shown in FIG. 6 is also discussed in Example 3.

EXAMPLES

Example 1

Plano Mirror-Blank Scalable to 1 Meter

Figures 5A, 5B:
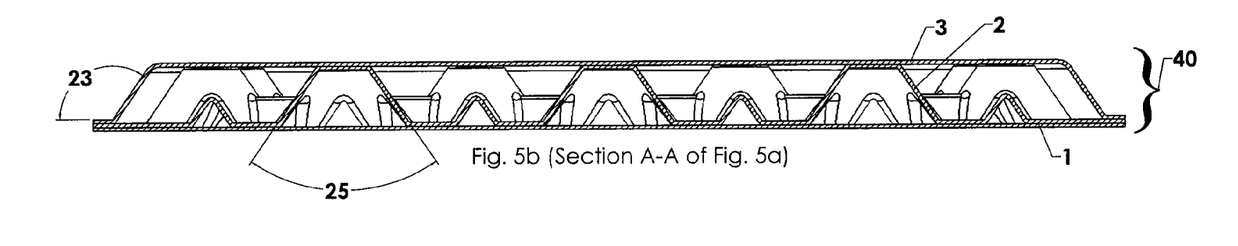

A three-layer, piano mirror blank, was constructed as shown in FIGS. 5a and 5b. The three-layer, piano mirror blank was constructed by first releasing layer one 1 from a graphite optical mandrel 1. Layer one 1 was then machined flat to a 3 mm thickness. On core mandrel 20, the deposition angle 23 was 125°. The core depth was 28.64 mm. The mandrel two support lands 21 spacing was 55.13 mm. The final mass, after removing the mandrels, was 1459.9 grams. The assembly diameter was trimmed to 303.25 mm using an abrasive water jet. Front and back surfaces to the mirror blank were machined with a 5-axis diamond tool. The final areal density was 20.1 kg/m$^2$. Coating thicknesses were close to 2 mm per layer.

Example 2

Plano Mirror-Blank

A three-layer, piano mirror blank was constructed by first releasing layer one 1 from a graphite optical mandrel 10. Layer one 1 was then machined flat to a 2 mm thickness. On core mandrel 20, the deposition angle 23 was 125°. The core depth was 14.25 mm. The center-to-center spacing between adjacent mandrel two support lands 21 was 39.27 mm. After machining the overall blank, the thickness was 22.85 mm. The final mass, after removing the mandrels, was 1296.8 grams. The final diameter was trimmed to 257.8 mm with an abrasive water jet. Front and back surfaces to the mirror blank were machined with a 5-axis diamond tool. The final areal density was 24.8 kg/m$^2$. Coating thicknesses were close to 2 mm per layer.

Example 3

Concave Mirror Blank Scalable to 1 Meter

A three-layer, concave mirror blank was constructed by first releasing layer one 1 from a graphite optical mandrel 10. The radius of curvature was 3.6 meter. Core mandrel 20 fit to the curved layer one 1 surface by abrasively working the deposited SiC against graphite. Back plate mandrel 30 was fit to the layer two 2 by adjusting the holes in back plate mandrel 30. On core mandrel 20, the deposition angle 23 was 125°. The coating for layer two 2 was nominally 3 mm thick. Front and back surfaces to the mirror blank were machined with a 5-axis diamond tool. The mirror assembly mass was 2248.5 grams with the mandrels removed.

Example 4

Convex Mirror Blank

The construction was similar to Example 3. The center-to-center spacing between adjacent mandrel two support lands 21 was 38.65 mm. The radius of curvature was 0.9 meters. After the mandrels were removed the assembly weighed 2385.9 grams. On core mandrel 20, the deposition angle 23 was 125°. The coating for layer two 2 was nominally 3 mm thick.

Example 5

Two-Layer Piano Mirror Blank

Figures 7A, 7B, 7C:
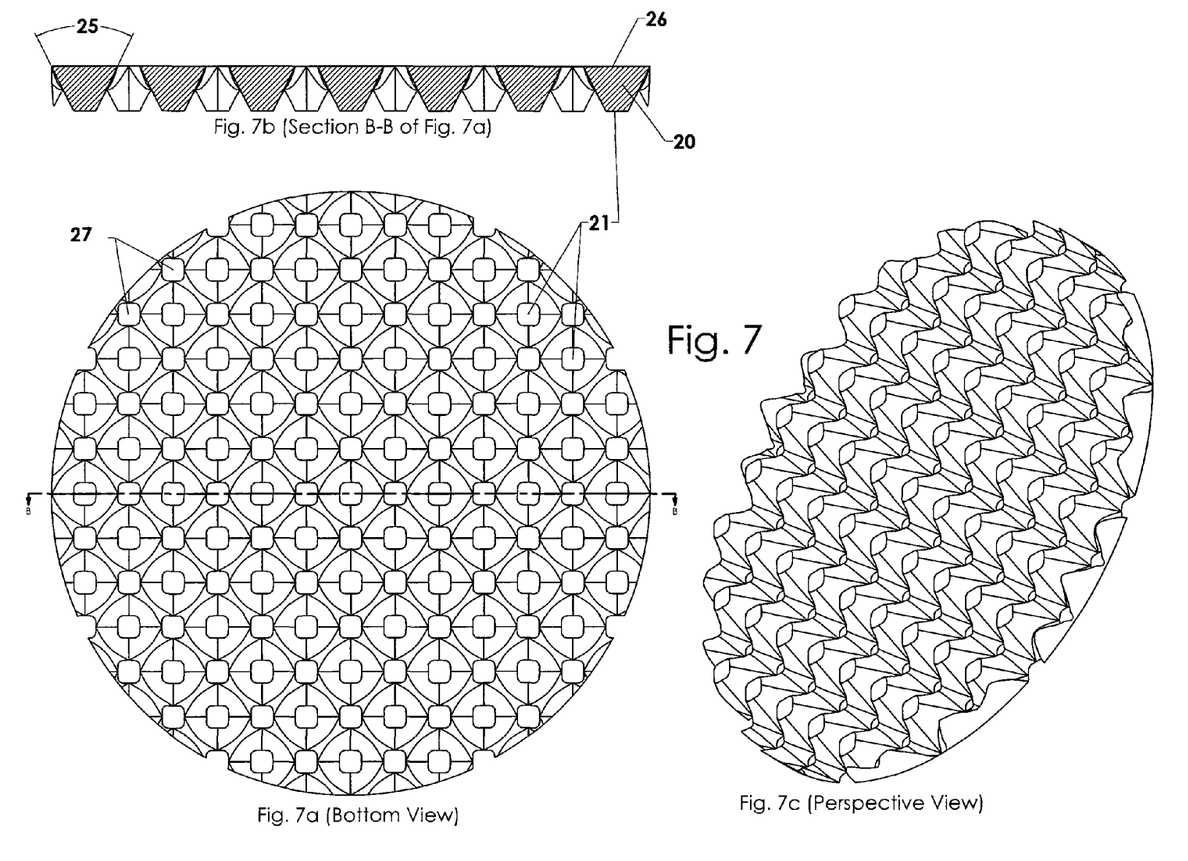
FIG. 7a is a bottom-view illustration of an alternate core mandrel design that may be used by the present invention with a cross-sectional line B-B.
FIG. 7b is a cross-sectional illustration of the core mandrel shown in FIG. 7a along the cross-sectional line B-B.
FIG. 7c is a perspective-view illustration of an alternate design for a core mandrel that may be used by the present invention.

In some applications, adequate mirror stiffness can be achieved with two layers. In this exemplary embodiment core mandrel 20 is represented in bottom view FIG. 7a, a cross-sectional view in FIG. 7b and a perspective view in FIG. 7c. Core mandrel 20 was coated on a planar layer one 1. Mandrel two support lands 21 were 0.5 inch (12.7 mm) above the openings in mandrel two 27. Core mandrel 20 was 6.75 inches (171.5 mm) in diameter. Grooves in mandrel two 28 were omitted on this core. Core mandrel 20 burn out on this part was lengthy illustrating the need for grooves in mandrel two 28. The cone angle was 53.1° and the deposition angle was 116.6°.

While the illustrations show circular mirror blanks with circular components, the present invention applies to mirror blanks with other bounding geometries which flow from design needs. For example, a hexagonal mirror would more efficiently pack mandrel two support lands 21 more efficiently.

While clearly intended to be a lightweight mirror blank, the structures described herein may also be used as structural members in applications that demand the materials we have described.

While preferred embodiments of the invention have been shown and described herein, it is understood that such embodiments are provided by way of example only. Numerous variations, changes, and substitutions may occur to those skilled in the art without departing from the spirit of the invention. Accordingly, it is intended that the appended claims cover all such variations as fall within the spirit and scope of the invention.

What is claimed:

1. A lightweight mirror assembly comprising:
a first layer,
multiple support structures forming a second layer disposed on top of the first layer,
the support structures including sloping walls extending upwardly at an obtuse angle from the first layer, and terminating at a first height, and
a plurality of ribs connecting adjacent support structures and extending upwardly from the first layer, having a second height measured from the first layer, wherein the first height is larger than the second height.

2. The mirror assembly of claim 1 wherein
at least one of the ribs forms a wall extending upwardly from the first layer.

3. The mirror assembly of claim 1 wherein
at least one of the ribs forms a rod extending between adjacent support structures.

4. The mirror assembly of claim 1 wherein
at least one of the support structures includes at least one of the sloping walls terminating in a flat portion at the first height.

5. The mirror assembly of claim 1 wherein
three of the ribs connecting non-collinear, adjacent support structures form three respective lines.

6. The mirror assembly of claim 1 wherein
at least one of the support structures includes sloping walls forming a portion of a pyramid.

7. The mirror assembly of claim 1 wherein
at least one of the support structures includes a circular sloping wall forming a portion of a cone.

8. The mirror assembly of claim 1 wherein
at least one of the ribs forms a step extending upwardly from the first layer.

9. The mirror assembly of claim 1 wherein
a third layer is disposed on top of the second layer;
wherein said third layer terminates at a third height and said third layer joins the support structures into a common surface.

10. The mirror assembly of claim 9 wherein
the third height is the same as the first height.

11. The mirror assembly of claim 1 wherein
the first layer and the second layer are comprised of the same material.

12. The mirror assembly of claim 11 wherein
the first layer and the second layer are comprised of silicon carbide.

13. The mirror assembly of claim 11 wherein
the first and the second layer are comprised of boron carbide.

14. The mirror assembly of claim 11 wherein
the first and the second layer are comprised of titanium diboride.

15. The mirror assembly of claim 9 wherein
a plurality of layers is disposed on top of the previous layer;
wherein said plurality of layers are joined to preceding layers by chemical deposition.

16. A core mandrel for producing a mirror assembly comprising:
multiple support structures including walls extending upwardly at an obtuse angle from a base of the mandrel and terminating at a first height,
and a plurality of ribs connecting adjacent support structures and extending upwardly from the base of the mandrel, having a second height measured from the base of the mandrel,
wherein said ribs and said support structures define at least one opening in the core mandrel.

17. The core mandrel of claim 16 wherein
at least one of the ribs forms a wall extending upwardly from the base of the mandrel.

18. The core mandrel of claim 16 wherein
at least one of the ribs forms a rod extending between adjacent support structures.

19. The core mandrel of claim 16 wherein
at least one of the support structures includes at least one of the sloping walls terminating in a flat portion at the first height.

20. The core mandrel of claim 16 wherein
three of the ribs connecting non-collinear, adjacent support structures form three respective lines.

21. The core mandrel of claim 16 wherein
at least one of the support structures includes sloping walls forming a portion of a pyramid.

22. The core mandrel of claim 16 wherein
at least one of the support structures includes a circular sloping wall forming a portion of a cone.

23. The core mandrel of claim 16 wherein
at least one of the ribs forms a step extending upwardly from the first layer.

* * * * *